(12) United States Patent
Oppelt et al.

(10) Patent No.: US 6,704,589 B1
(45) Date of Patent: Mar. 9, 2004

(54) METHOD AND DEVICE FOR RECORDING AN IMAGE OF AN OBJECT SURFACE USING FOCUSSED RADIATION

(75) Inventors: Ralph Oppelt, Uttenreuth (DE); Markus Vester, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/048,279

(22) PCT Filed: Jul. 21, 2000

(86) PCT No.: PCT/DE00/02401

§ 371 (c)(1),
(2), (4) Date: Jan. 28, 2002

(87) PCT Pub. No.: WO01/09577

PCT Pub. Date: Feb. 8, 2001

(30) Foreign Application Priority Data

Jul. 30, 1999 (DE) .......................... 199 35 909

(51) Int. Cl.[7] ................................. A61B 5/05
(52) U.S. Cl. ........................ 600/407; 600/437
(58) Field of Search ................. 600/407–480; 73/585–630; 351/200–247

(56) References Cited

U.S. PATENT DOCUMENTS

| 3,685,051 A | | 8/1972 | Wells | |
|---|---|---|---|---|
| 3,909,827 A | | 9/1975 | Tricoles et al. | |
| 3,953,825 A | * | 4/1976 | Kino et al. ................. | 367/7 |
| 4,112,411 A | * | 9/1978 | Alais et al. ................. | 367/135 |
| 4,457,175 A | * | 7/1984 | Ramsey et al. ............. | 73/606 |
| 4,570,488 A | * | 2/1986 | Miwa et al. ................ | 73/626 |
| 4,608,868 A | | 9/1986 | Green | |
| 4,694,434 A | * | 9/1987 | von Ramm et al. ......... | 367/7 |
| 4,880,010 A | * | 11/1989 | Szilard ...................... | 600/457 |
| 5,014,711 A | * | 5/1991 | Nagasaki .................... | 600/443 |
| 5,797,845 A | * | 8/1998 | Barabash et al. ........... | 600/443 |
| 5,842,991 A | | 12/1998 | Barabash | |
| 5,901,708 A | * | 5/1999 | Chang et al. ............... | 600/443 |
| 6,138,513 A | * | 10/2000 | Barabash et al. ........... | 73/602 |

FOREIGN PATENT DOCUMENTS

DE 2655274 12/1976

OTHER PUBLICATIONS

XP–000972661 "Crossed–Transducers Array for Transmission Ultrasonic Imaging," by M. Bernard, Labo. Biomedical, Department ISSV, ENSI 46 rue Barrault 75634 Paris Cedex 13, France, pp. 732–735.

* cited by examiner

Primary Examiner—Dennis Ruhl
Assistant Examiner—William C. Jung
(74) Attorney, Agent, or Firm—Baker Botts LLP (57) ABSTRACT

The invention relates to a method and a device for taking an image 2 of an object surface 1 by means of a focusable radiation 3. An array of object elements 4 that covers the object surface is defined; then, for each object element 1, a first signal of the radiation that is focused onto an associated transmitter line 5, including said object element, in the object surface is emitted, and a second signal of the radiation that is generated by means of said first signal and is focused onto an associated receiver line 6, including the object element and crossing said transmitter line, in the object surface is received and an associated image information item is picked up therefrom; finally, the image is composed from the image information items of all the object elements.

20 Claims, 8 Drawing Sheets

METHOD AND DEVICE FOR RECORDING AN IMAGE OF AN OBJECT SURFACE USING FOCUSSED RADIATION

FIELD OF THE INVENTION

The invention relates to a method and a device for taking an image of an object surface by means of a focusable radiation, in particular, ultrasound. Within the scope of the invention, the aim is to generate an image of a two-dimensional surface with the aid of simple means.

BACKGROUND OF THE INVENTION

The dissertation entitled "Theoretische und experimentelle Untersuchungen zur quasioptischen Abbildung mit einer Ultraschall-Transmissionskamera"["Theoretical and experimental investigations into quasi-optical imaging with the aid of an ultrasonic transmission camera"] by Ralph Oppelt, Friedrich Alexander University of Erlangen-Nurnberg, Germany, 1985, pages 21–32, discloses a device ("the Oppelt device") for taking an image of an object surface by means of ultrasound which has an unfocused ultrasound transducer as transmitter for the radiation, and a two-dimensional arrangement having many ultrasound transducers as receiver. A corresponding method for taking an image by using this device is also apparent from the dissertation. A substantial disadvantage of this prior art device is the high level of complexity of the receiver. Each transducer forms an array element of the image to be taken, and therefore the number of the transducers must be extremely high, in particular many thousands, to obtain a sufficiently sharp image. The device for evaluating the signals of all the transducers would also require a correspondingly complicated design.

In the article entitled "Crossed-Transducers Array for Transmission Ultrasonic Imaging" by M. Bernard, IEEE 1983 Ultrasonics Symp., page 732, a device is disclosed which provides a linear arrangement of many rod-shaped transducers both for the transmitter and for the receiver. The arrangement of the receiver is aligned orthogonally to the arrangement of the transmitter. Each transducer of the transmitter generates a signal extending in the shape of a strip, and each transducer of the receiver is sensitive to a strip-shaped signal. An array for the image to be taken is defined by the crossing points of the strip-shaped signals respectively of a transducer in the transmitter, and respectively of a transducer in the receiver. An essential feature of this device is that the number of the transducers is substantially reduced, in contrast to the Oppelt device, however, this device is suitable exclusively for taking an image in the near field region of each transducer used. This results in the device being unsuitable in principle for taking an image of a sharpness desired for applications, such as medical imaging or in nondestructive testing. The device is also unsuitable for taking an image of an object surface which is located in the interior of an object that is extended relative to the wavelength of the ultrasound used.

DE 26 55 274 A1 also discloses a method and a device for taking an image of an object surface by means of ultrasound. In this device, a two-dimensional arrangement with many ultrasound transducers serves both as transmitter and as receiver. The individual ultrasound transducers are combined to form a plurality of line groups in the transmit mode and in the receive mode. The line groups in the transmit mode are orthogonal to the line groups in the receive mode. The disclosed device is intended in this case exclusively for a reflection mode, and it is not possible to transradiate the object surface to be imaged which is necessary for a transmission mode.

SUMMARY OF THE INVENTION

The object of the present invention is to provide a simple method and device for imaging an object surface by means of focusable radiation, e.g., ultrasound which results in an image having high quality precision and sharpness. Furthermore, the method and device of the present invention are intended to be suitable both for a reflection mode and for a transmission mode. Such a method comprises the following steps:

a) defining an array, covering the surface of the object elements;

b) for each object element:
   1) using a transmitter to emit a first signal of the radiation that is focused onto an associated transmitter line, including the object element, in the object surface;
   2) using a receiver constructed separately from the transmitter to receive a second signal of the radiation that is focused onto an associated receiver line, including the object element and crossing the associated transmitter line, in the object surface;
   3) picking-up an associated image information item for the object element from the second signal; and c) composing the image from the image information items of all the object elements.

The foregoing method is achieved by using a device for taking an image of an object surface by means of a focusable radiation, which comprises the following components:

a) means for defining an array of object elements that covers the object surface;

b) a transmitter, which is set up in order to emit for each object element a first signal of the radiation that is focused onto an associated transmitter line, including the object element, in the object surface;

c) a receiver, constructed separately from the transmitter, which is set up in order to receive for each object element a second signal of the radiation that is generated by means of the first signal and is focused onto an associated receiver line, including the object element and crossing the associated transmitter line, in the object surface;

d) a co-ordination device for controlling the transmitter and the receiver in such a way that for each object element a first signal is emitted and a second signal is received, and an associated image information item is picked up from each second signal; and e) a composing device for composing the image from the image information items of all the object elements.

Accordingly, the present invention requires an array of object elements to be defined in the object surface the image of which is to be taken. This array is provided by crossing points of transmitter lines and receiver lines. A transmitter is used which is set up in order optionally to generate a first signal focused onto any desired transmitter line, and a receiver is used which is set up in order optionally to receive a second signal focused onto each receiver line. The transmitter and receiver are separate units. The selection of a pixel in relation to which an image information item is to be picked up is performed by selecting the associated transmitter line and the associated receiver line, emitting the corresponding first signal, and receiving the corresponding second signal. Since the transmitter line and the receiver line cross one another only in the corresponding object element, the image information item derived from the second signal corresponds to the desired image information item of the object element.

It is possible by using a focusing transmitter and a focusing receiver to determine the object surface freely and to operate outside the near field regions of the transmitter and the receiver. This removes any corresponding restriction, thereby making it possible to use a virtually controllably fine array for the object surface, and thus to generate an image of the object surface down to a fineness limited only by the wavelength of the radiation used. Any restriction regarding the extension of an object in which the object surface lies is also removed. It is therefore possible to produce a sectional image of a real object, in particular a living body in the field of medical imaging technology, or of a technical object within the field of nondestructive material testing.

It is necessary to ensure in each application that the transmitter and the receiver are suitably coupled to an object to be investigated. The structural separation of transmitter and receiver permits a very wide possibility of uses. Further, depending on the positioning of transmitter and receiver (with reference to the object surface), a reflection mode or a transmission mode is possible.

In a preferred embodiment of the novel method and the device, each receiver line crosses each transmitter line orthogonally. This enables an array resulting therefrom to be a conventionally orthogonal array.

In a further preferred embodiment of the present invention the object surface is flat, in which case the transmitter and the receiver may require a particular configuration which is disclosed hereinbelow in the context of an exemplary embodiment.

In accordance with the present invention, the second signal is preferably generated by transmission of the first signal through the object surface, or by reflection of the first signal at the object surface. Both transmission and reflection can be performed with or without deflection of the first signal. Selection of the deflection may be suitable for obtaining specific information on the nature of the image surface or of the object including the image surface.

Ultrasound is preferred as the focusable radiation. An application of light, in particular laser light, and other electromagnetic radiation is, however, not excluded.

The means provided in the device for defining an array covering the surface of the object elements can be formed in various ways. A particularly preferred means in the form of a map installed in the co-ordination device. This map can select from a plurality of transducers in the transmitter and/or in the receiver, a transducer which corresponds to a prescribed transmitter line or a prescribed receiver line. The map can also serve the purpose of setting a predetermined position for a single transducer in the transmitter and/or a single transducer in the receiver, in accordance with the selected transmitter line or selected receiver line, respectively. The setting can be a mechanical displacement, or a direction effected by means of appropriate electronic control. It is also conceivable to provide the means as a combination of a map, installed in the co-ordination device, with a mechanical device, for example an arrangement of mechanical latches in the transmitter or in the receiver.

In a preferred embodiment, the transmitter or the receiver of the device comprises for each transmitter line or for each receiver line an associated transducer and an associated focusing means. The transducer can be of punctiform design and the focusing means of astigmatic design in order to achieve the desired linear focusing onto a transmitter line or a receiver line. Alternatively, it is preferred for each associated transducer to be of linear design, and each associated focusing means of cylindrical design. Focusing means include a lens, and depending on the application, specifically a cylindrical or astigmatic lens, or a cylindrical singly curved, or astigmatic double, in particular an elliptically curved mirror.

In a further preferred embodiment of the novel device the transmitter or the receiver is a phased array of transducers. Such a transmitter is distinguished in that the first signal it emits can be focused optionally onto any transmitter line with the aid of electronic means, without the need for mechanical intervention. The same is true for a corresponding receiver.

BRIEF DESCRIPTION OF THE DRAWINGS

The present invention is disclosed further in detail below in connection with exemplary embodiments of the invention and with the aid of the drawing, in which.

DETAILED DESCRIPTION OF THE INVENTION

Figure 1:
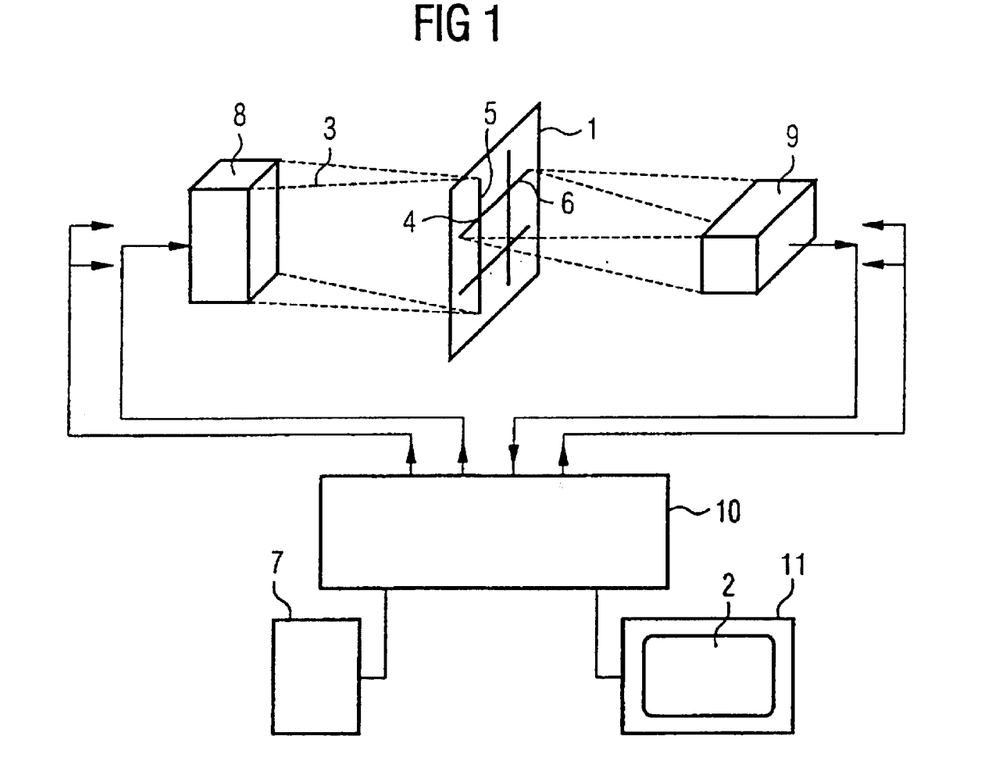
FIG. 1 schematically illustrates a device for taking an image of an object surface by means of a focusable radiation.

FIG. 1 shows a device for imaging an object surface 1 in an image 2 by means of a focusable radiation 3. Here, this radiation 3 is ultrasound, and it penetrates the object surface 1 in an approximately orthogonal fashion. An array of object elements 4 is defined in the object surface 1, each object element being a crossing point of a transmitter line 5 and a receiver line 6. The array is defined by a corresponding means 7, here a data memory 7, from which it is possible to call information for the specific control of a transmitter 8, provided for emitting the radiation 3, and a receiver 9, provided for receiving the radiation 3. The transmitter 8 and the receiver 9 are separate units. The transmitter 8 is set up in order to emit for each object element 4 a first signal of the radiation 3 that is focused onto the associated transmitter line 5, including the object element 4. The receiver 9 is set up in such a way that for each object element 4 it receives a second signal of the radiation 3 that is generated by means of the first signal and is focused onto a receiver line 6 associated with the object element 4 and crossing the associated transmitter line 5. This second signal corresponds to that portion of the radiation 3 emitted by the transmitter 8 which has penetrated the object surface 1 in the region of the object element 4 and thus bears an image information item associated with this object element 4. This image information item is, in particular, a phase angle or an intensity of the second signal relative to the first signal. In order to take the complete image 2, the associated image information item must be determined as described for each object element 4 of the object surface 1 and then the image information items of all the object elements 4 must be composed to form the desired image 2. A co-ordination device 10 is provided for this purpose which controls the transmitter 8 and the receiver 9, particularly by focusing them respectively onto a selected transmitter line 5 or receiver line 6, feeding the transmitter 8 with the energy required for emitting the signal, and receiving from the receiver 9 the information item corresponding to the second signal received from said receiver. The co-ordination device 10 co-operates for this purpose with the data memory 7, which includes the information required for focusing the transmitter 8 and the receiver 9. The data memory 7 can be a bulk storage device or program section in a co-ordination device 10 configured as a conventional computer with an appropriate program running thereon. Moreover, the data memory 10 can co-operate with mechanical means in the transmitter 8 and/or in the receiver 9, for example mechanical latches. Also connected to the co-ordination device 10, and controlled thereby is the composition device 11, illustrated here as a simple display screen, in which the image 2 is composed from the image information items of all the object elements 4.

The following Figures illustrate various exemplary embodiments of the arrangement composed of a transmitter 8, object surface 1 and receiver 9.

Figure 2:
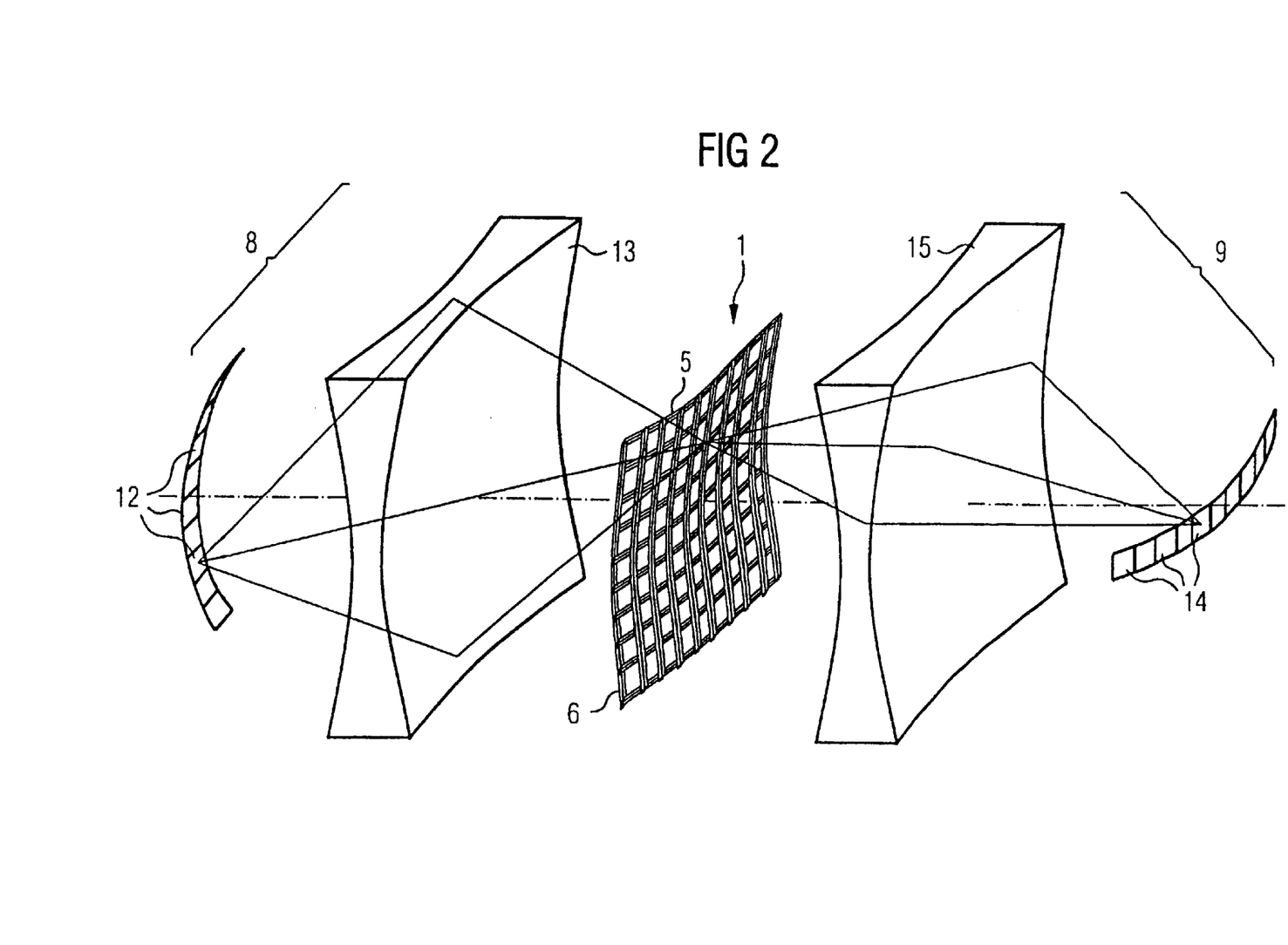
FIGS. 2–4 and 6–8 illustrate a variety of arrangements of transmitter, object surface, receiver and focusing means, wherein correspondingly parts illustrated in the Figures bear the same reference numerals.

FIG. 2 shows an arrangement of a transmitter 8, object surface 1 and receiver 9. The transmitter 8 comprises a multiplicity of punctiform transducers 12, which are arranged along a curved line, and a focusing means 13 in the form of an astigmatic lens. The receiver 9 likewise comprises a multiplicity of punctiform transducers 14, arranged along a curved line, and a focusing means 15, also an astigmatic lens. The illustrated arrangement must be designed taking account of the fundamentals of wave mechanics which are well-known to those skilled in the art. The object surface 1 in the embodiment shown in FIG. 2 is a curved saddle surface which includes all the transmitter lines 5 and all the receiver lines 6 crossing the transmitter lines 5. The arrangement thus supplies a sharp image of the curved object surface 1. The simple focusing means 13 or 15 shown in FIG. 2 can be replaced by an adjustable focusing means of a more complicated design in order to be able to displace the position of the object surface 1 to be imaged, and thus to be able to take an image sequence of a three-dimensional volume.

Figure 3:
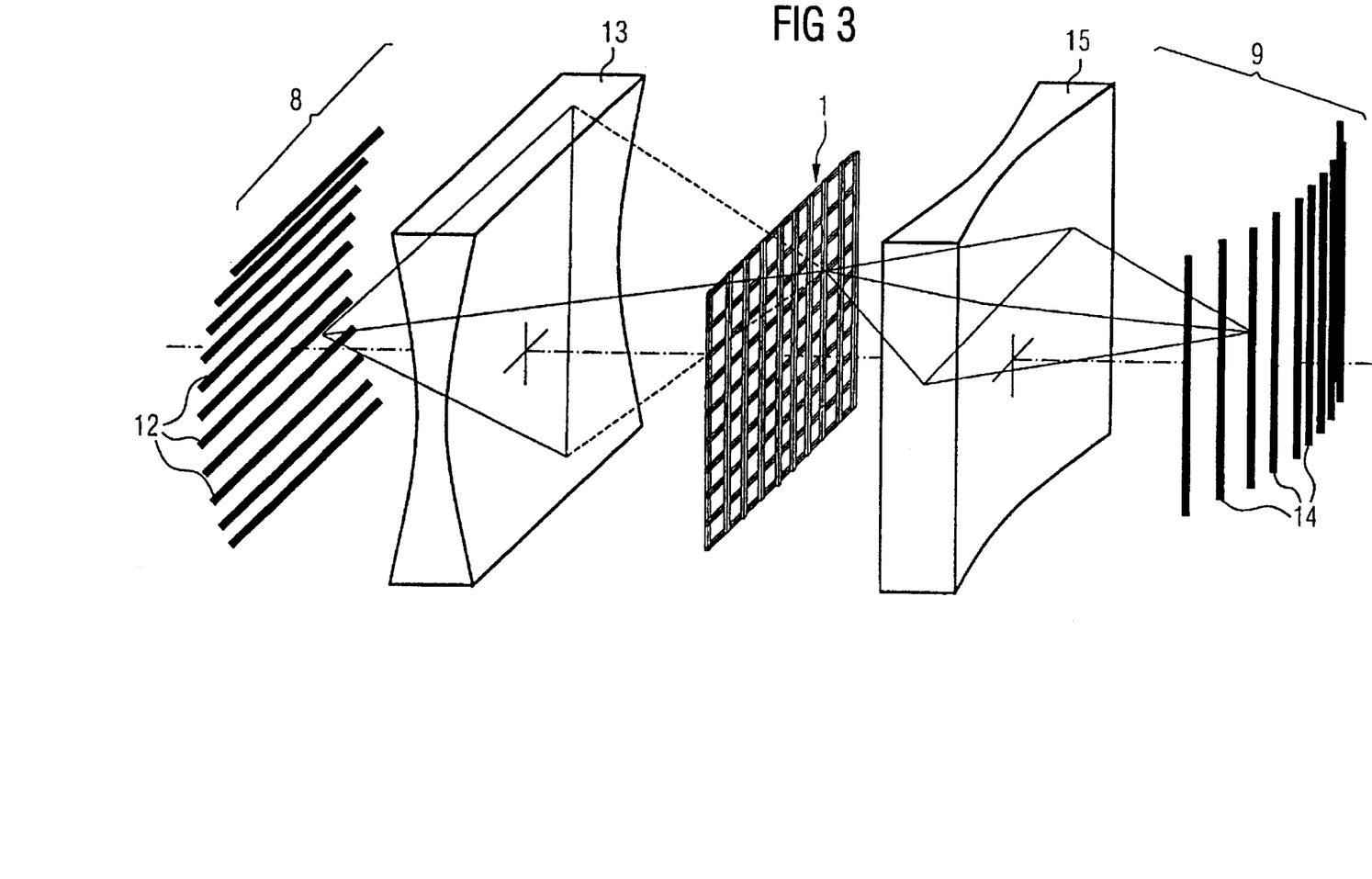

FIG. 3 shows an arrangement with a transmitter 8, object surface 1 and receiver 9. The transmitter 8 has a multiplicity of linear transducers 12 which are arranged in a simple curved surface next to one another. Focusing means 13 is in the form of a cylindrical lens. The receiver 9 is of similar design, with a multiplicity of transducers 14, likewise arranged in the simple curved surface, and a cylindrical lens 15 as the focusing means. The object surface 1 is flat in this arrangement. This arrangement also requires the relevant principles of wave mechanics to be observed for its concrete design.

Figure 4:
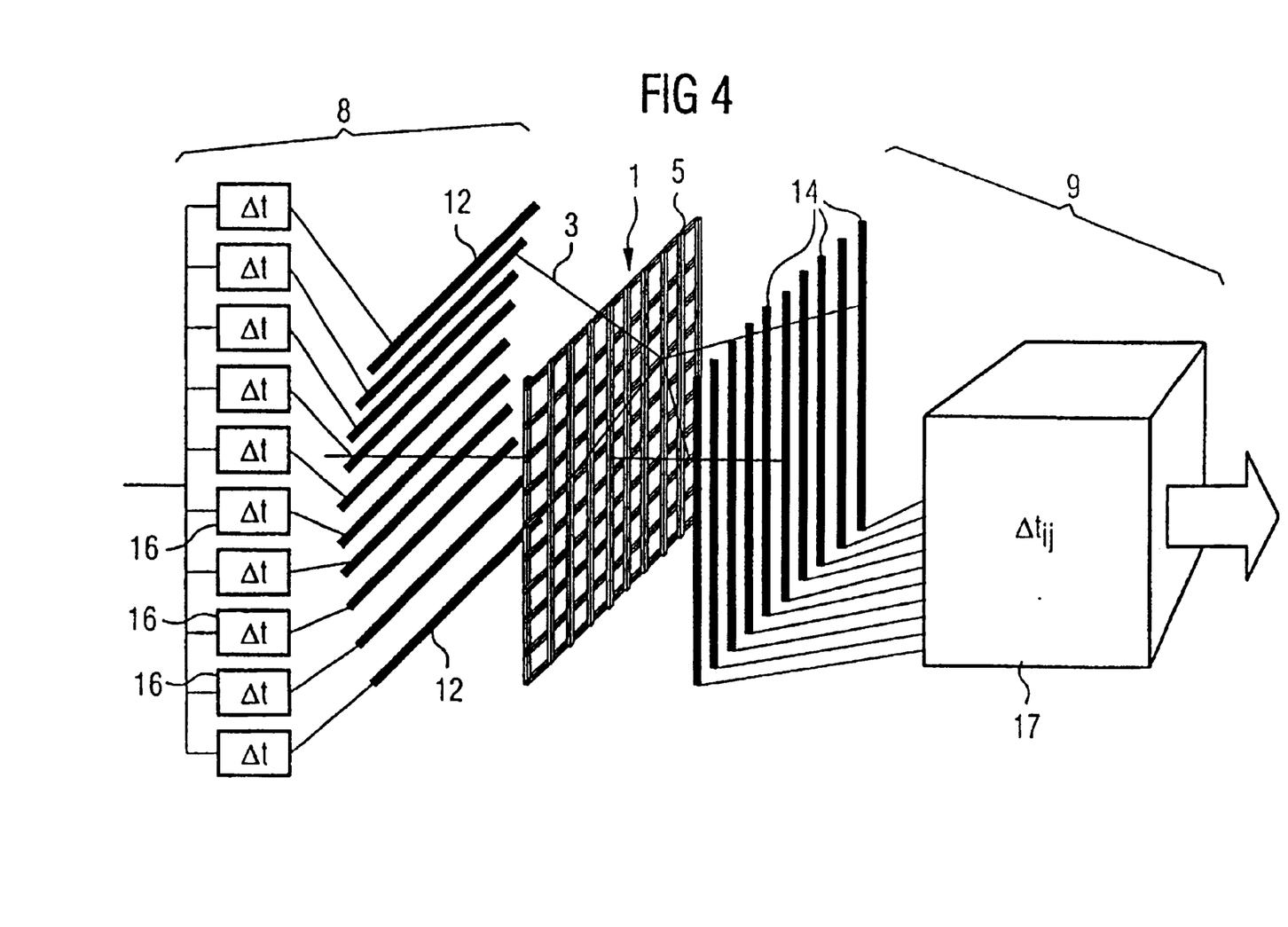

FIG. 4 shows an arrangement with a transmitter 8, a flat object surface 1 and receiver 9. The transmitter 8 has many transducers 12 which are arranged in a curve and are fed with energy via an arrangement with many phase shifters 16 assigned to a transducer 12. By appropriately setting the phase shifters 16, the radiation emanating from the transmitter 8 can be set optionally to each transmitter line 5. Such a transmitter 8 is known as a "phased array." Such a transmitter permits the radiation 3 emanating from it to be directed as stipulated and to be focused, it being possible to perform this within certain limits solely by suitable setting of the phase shifters 16. It is also possible for the transducers 12 to be displaced mechanically in addition to the setting of the phase shifters 16. The receiver 9 is also fashioned as a phased array with the many linear transducers 14 being arranged in a flat surface. The receiver 9 can be directed and focused by means of a drive for the transducers 14 via a phase shifter network 17. In order to utilize comprehensively the energy, available for the receiver 9, of the received second signal, it makes sense for image information items of a plurality of object elements 4 on different receiver lines 6 to be evaluated simultaneously or in parallel, instead of consecutively over time. This would require in the phase shifter network 17 appropriate, mutually parallel sub networks, each for focusing onto an associated receiver line 6. It is therefore possible to take a complete image 2 with a good signal-to-noise ratio in a relative short time, short enough for recording a movement in a sequence of a plurality of images 2.

Figure 5:
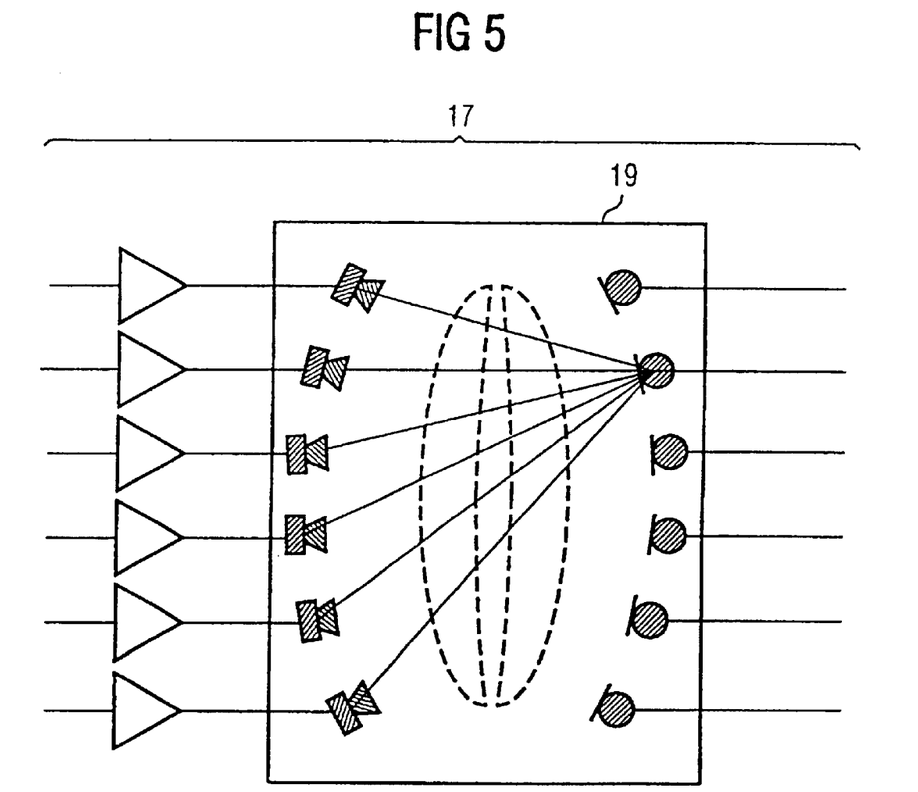
FIG. 5 illustrates a possible phase shifter network shown in FIG. 4.

As shown in FIG. 5, the design of the phase shifter network 17 need not necessarily be entirely electronic. It is possible to make use in some circumstances in this phase shifter network 17 of an electroacoustic transducer 19 which operates, in particular, with surface waves. In some circumstances, such a transducer 19 replaces a complicated electronic network with a great advantage in design.

Figure 6:
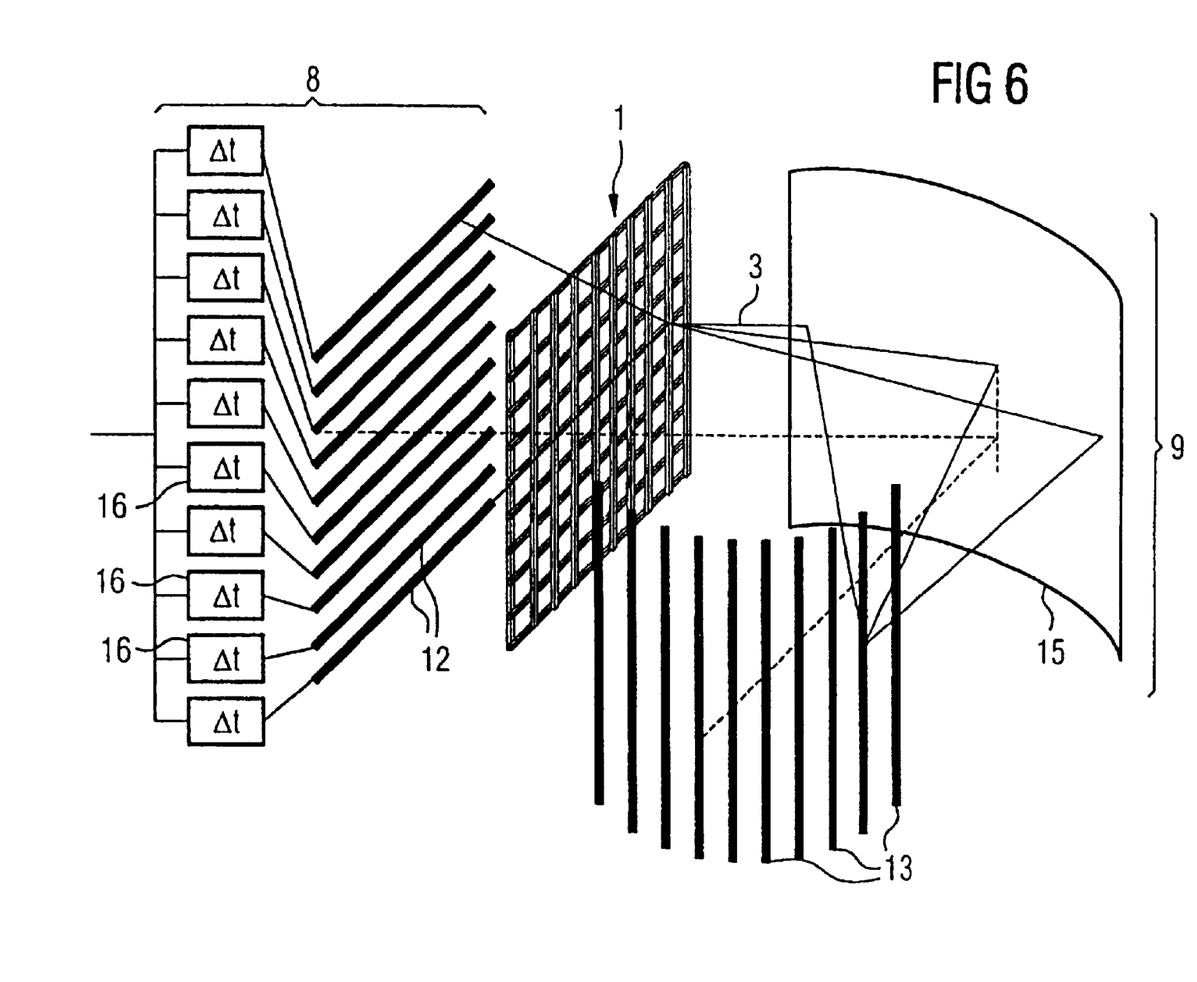

The embodiment of the invention shown in FIG. 6 illustrates how focusing by means of a mirror 15 can be performed instead of focusing with the aid of a lens. The mirror 15 is simply or multiply curved depending on the requirements and the fashioning of the associated transducers 14. The mirror 15 has the advantage over lenses that neither chromatic aberration nor transmission attenuation is present. The mirror 15 is also advantageously used to fold the path of the radiation 3, and this benefits the compactness of the device. In accordance with FIG. 6, the receiver 9 is designed with linear transducers 13 and an elliptically curved mirror 15, while the transmitter 8 is designed as a phase array corresponding to the design in accordance with FIG. 4. The design of the receiver 9 as shown in FIG. 6 also brings into consideration the design of a transmitter 8. In the design in accordance with FIG. 6 the transducers 12 and 13 are designed for ultrasound at a frequency of between 1 MHz and 5 MHz, and the object surface 1 is approximately a 10 cm square.

Figure 7:
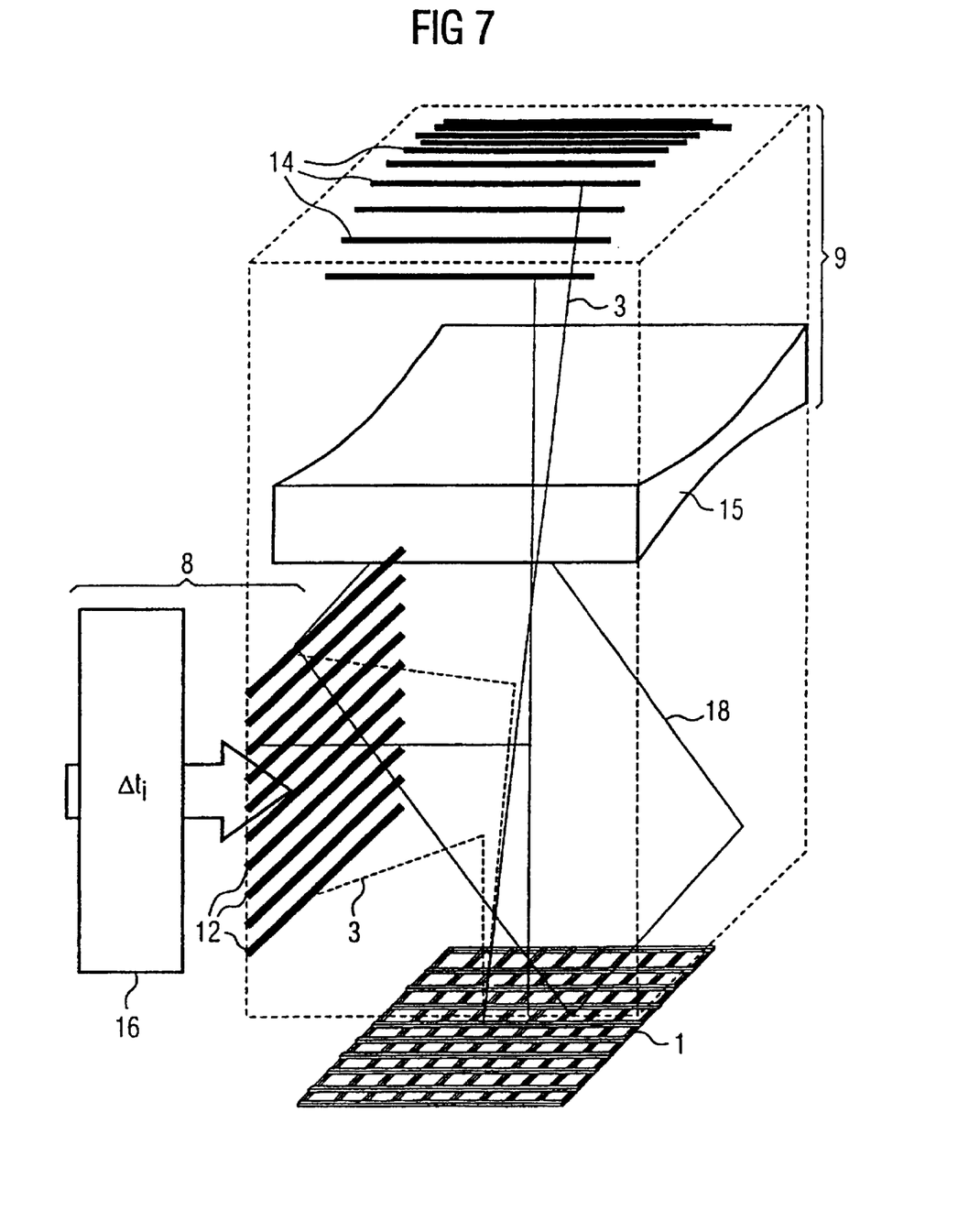

The embodiments of the invention illustrated in FIGS. 2 to 4 and 6 are set up in each case in such a way that the radiation 3 used for taking the desired image is transmitted through the object surface 1. However, there are alternatives to this set up which, depending on application, can deliver better or additional image information. Accordingly, FIG. 7 shows an embodiment of the present invention in which radiation 3 is evaluated which has been reflected at right angles from the object surface 1. The transmitter 8 is a flat phased array with many transducers 12 and a phase shifter network 16, analogous to the receiver 9 in FIG. 4. The transmitter 8 emits the radiation 3, specifically ultrasound, initially parallel to the object surface 1, until said radiation strikes the semitransparent mirror 18, which is aligned obliquely to the object surface 1 and directs the radiation 3 emanating from the transmitter 8 perpendicularly onto the object surface 1. The radiation is reflected perpendicularly, and passes through the semitransparent mirror 18 to the receiver 9 which comprises an arrangement of transducers 14 and a cylindrical lens 15 corresponding to the embodiment shown in FIG. 3. The embodiment in accordance with FIG. 7 can be designed in a very compact fashion in order to take an image by means of reflecting the radiation 3 at the object surface 1.

Figure 8:
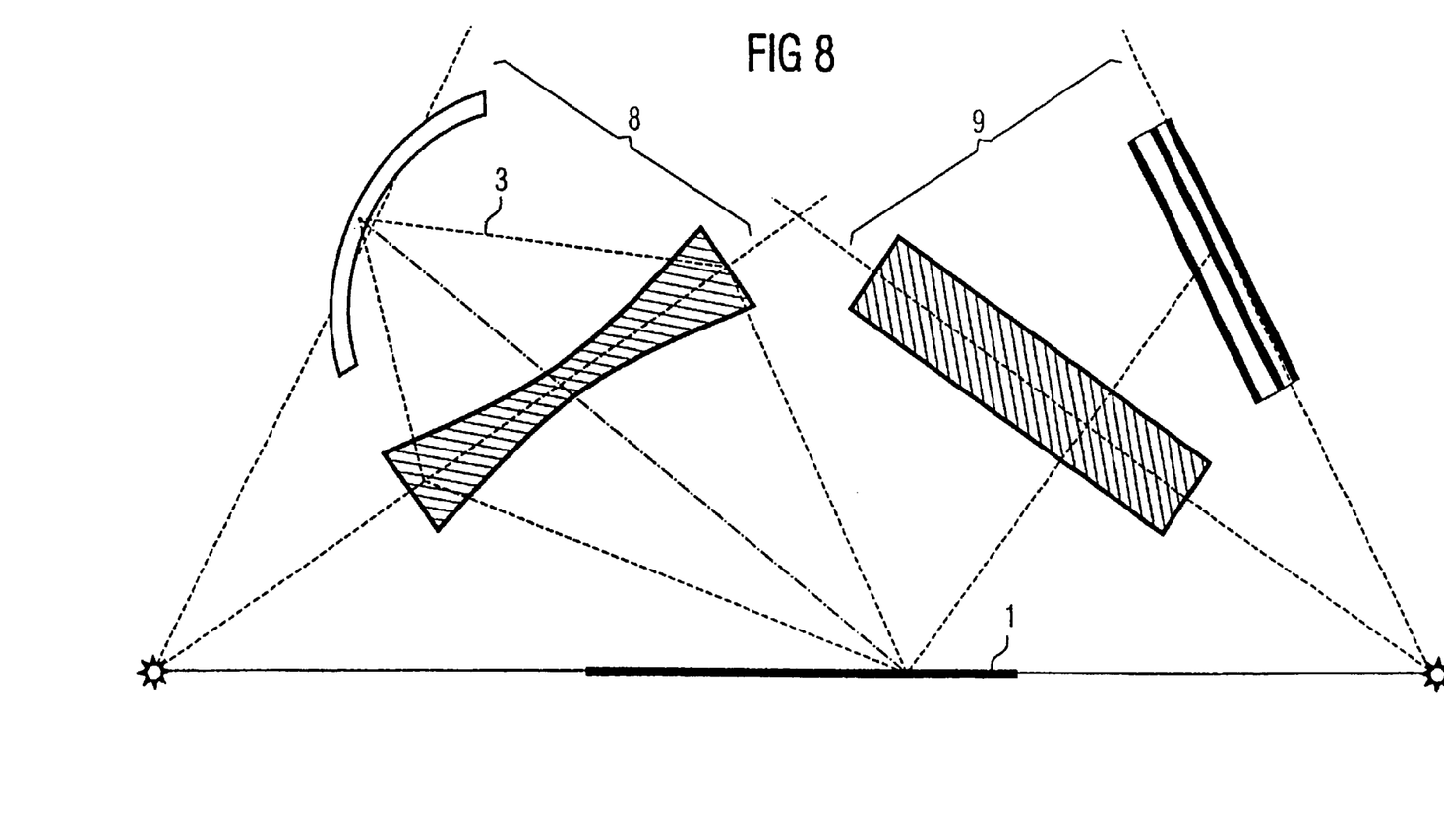

FIG. 8 shows an embodiment of the invention with a transmitter 8 and a receiver 9, which are both designed in principle according to the design in accordance with FIG. 3.

However, the transmitter 8 and the receiver 9 are both inclined relative to the object surface 1 in accordance with the Scheimpflug principle of wave mechanics. Radiation 3, which passed from the transmitter 8 to the receiver 9, is correspondingly reflected obliquely at the object surface 1. It may be seen from this that in principle the invention does not constitute any sort of precondition with regard to the way in which the radiation 3 sent from the transmitter 8 to the object surface 1 finally passes to the receiver 9. It is thereby possible in principle to render the scattering properties, dependent on the angle of deflection of the incoming and outgoing radiation 3, of the material which forms the object surface 1 comprehensively useful for obtaining an informative image 2 of the object surface 1.

What is claimed is:

1. A method for obtaining two-dimensional image of an object surface by means of focusable radiation comprising:

(i) defining on the object surface an array of object elements comprising crossing points of a transmitter line and receiver line; and for each object element:

(a) using a transmitter having an associated transducer, to emit a first signal of the radiation focused on a desired transmitter line;

(b) using a receiver, having an associated transducer which is separate from the transmitters transducer, to receive substantially simultaneously a second signal of the radiation that is generated by means of the first signal and is focused on a desired receiver line crossing the transmitter line and further utilizing a phase shifter network so that display information of multiple object elements can be recorded on different receiving lines at the same time;

(c) picking-up an associated image information item for the object element from the second signal; and thereafter, (ii) composing an image from the image information items of substantially all of the object elements.

2. The method according to claim 1, wherein each receiver line orthogonally crosses each transmitter line.

3. The method according to claim 1, wherein the object surface is flat.

4. The method according to claim 1, further comprising generating the second signal by means of transmitting the first signal through the object surface.

5. The method according to claim 1, further comprising generating the second signal by means of a reflection of the first signal from the object surface.

6. The method according to claim 1, in which ultrasound is used as the radiation.

7. A device for obtaining a two-dimensional image of an object surface by means of focusable radiation, comprising;

a) means for defining an array of object elements located on the object surface comprising crossing points of a transmitter line and receiver line;

b) a transmitter, having an associated transducer, which emits a first signal of radiation that is focused onto a desired transmitter line;

c) a receiver, having an associated transducer separate from the transmitter's transducer, which receives a second signal of radiation that is generated by means of the first signal and is focused onto a desired receiver line crossing the transmitter line in one of said object elements, whereby the receiver's transducer and the tansmitter's transducer are simultaneously receiving and emitting respectively, further comprising a phase shifter network;

d) a co-ordination device for controlling the transmitter and the receiver so that for each object element a first signal is emitted and a second signal is received, and an associated image information item is picked-up from each second signal; and e) a device for composing an image from the image information items of substantially all the object elements.

8. The device according to claim 7, wherein the means for defining the array of object elements is installed in the co-ordination device.

9. The device according to claim 7, wherein for each transmitter line and receiver line, the transmitter and the receiver have an associated focusing means.

10. The device according to claim 9, wherein the associated transducer is punctiform, and the associated focusing means is astigmatic.

11. The device according to claim 9, wherein said associated transducer is linear, and a associated focusing means is cylindrical.

12. The device according to claim 9, wherein said focusing means is a lens.

13. The device according to claim 9, wherein said focusing means is a mirror.

14. The device according to claim 7, wherein the tansmitter and/or the receiver is a phased array of transducers.

15. The device according to claim 7, wherein the transmitter has a flat transmit line and the receiver has a flat receiver line.

16. The device according to claim 7, wherein the receiver receives radiation which is transmitted by the object surface.

17. The device according to claim 7, wherein the receiver receives radiation which is reflected from the object surface.

18. The device according to claim 7, wherein the focusable radiation is set up for ultrasound.

19. The device according to claim 7 wherein the associated transducer is punctiform.

20. The device according to claim 7 wherein an associated transducer is linear.

* * * * *